United States Patent
Edwards et al.

(10) Patent No.: US 6,174,612 B1
(45) Date of Patent: *Jan. 16, 2001

(54) POLYETHYLENES WITH ENHANCED HEAT SEAL PROPERTIES

(75) Inventors: Ray Edwards, Henderson; Bruce Alexander Gillespie, Overton; Diane Hines Farnham, Longview, all of TX (US)

(73) Assignee: Eastman Chemical Company, Kingsport, TN (US)

( * ) Notice: Under 35 U.S.C. 154(b), the term of this patent shall be extended for 0 days.

This patent is subject to a terminal disclaimer.

(21) Appl. No.: 09/088,904

(22) Filed: Jun. 2, 1998

Related U.S. Application Data

(60) Provisional application No. 60/055,770, filed on Aug. 14, 1997.

(51) Int. Cl.$^7$ ..................................................... B32B 27/32
(52) U.S. Cl. ............................ 428/523; 428/461; 525/240
(58) Field of Search ............................. 525/240; 428/516, 428/515, 500, 523, 461

(56) References Cited

U.S. PATENT DOCUMENTS

| | | | |
|---|---|---|---|
| 4,339,507 | 7/1982 | Kurtz et al. | 428/527 |
| 5,268,230 | 12/1993 | Edwards | 428/409 |
| 5,350,476 | 9/1994 | Edwards | 156/244.11 |
| 5,536,542 | 7/1996 | Gillespie et al. | 428/34.3 |
| 5,756,193 * | 5/1998 | Yamamoto et al. | 428/220 |

FOREIGN PATENT DOCUMENTS

| | | |
|---|---|---|
| 0 129 312 A1 | 12/1984 | (EP) . |
| WO 83/00490 A1 | 2/1983 | (WO) . |
| WO 94/06857 A1 | 3/1994 | (WO) . |

OTHER PUBLICATIONS

*Converting Magazine,* Mar. 1997, entitled "Benefits, Processing Ease, Keep LDPE in the Mix".

* cited by examiner

*Primary Examiner*—Paul Thibodeau
*Assistant Examiner*—D. Lawrence Tarazano
(74) *Attorney, Agent, or Firm*—Jonathan D. Wood; Harry J. Gwinnell

(57) ABSTRACT

An improved extrusion coating is described comprising at least two polyethylene homopolymers, one component being a low melt index medium density polyethylene homopolymer, and another component being a high melt index low density polyethylene homopolymer. Superior heat seal strengths are achieved with this blend.

6 Claims, No Drawings

POLYETHYLENES WITH ENHANCED HEAT SEAL PROPERTIES

CROSS-REFERENCE TO RELATED APPLICATIONS

This application claims the benefit under 35 U.S.C. § 119(e) of U.S. Provisional Application Ser. No. 60/055,770, filed Aug. 14, 1997, and incorporated herein.

FIELD OF THE INVENTION

The present invention relates to a composition of matter obtained by the blending of two polyethylenes to provide strong heat seals for extrusion coated structures.

BACKGROUND OF THE INVENTION

Prior art blends of polyethylenes are discussed, for instance, in U.S. Pat. No. 4,339,507. One component of this blend is a linear low density copolymer of ethylene and octene and a second component is a low density polyethylene homopolymer. An example of such a linear low density polyethylene blend is Dow Chemical Company's Linear Low Density Polyethylene 3010. Such blends are typically useful as extrusion coatings onto various structures, such as flexible polymeric film/paper packages for foods, and metallized polymeric film balloons. The coatings serve as heat seal media and as barriers to protect the contents of a package from outside contamination, or to retain the contents, such as a gas such as helium, within a coated and sealed balloon. The ethylene-octene copolymer component of the prior art two-component blends is used to provide strong heat seal strengths required in certain extrusion coated structures.

However, these prior art blends create many problems in an extrusion coating operation. In particular, the blends require excessively high extruder amps to extrude; some extruders are not rated for these high amps. The high amps requirement is the reason that low density polyethylenes are combined with the copolymers, usually at about 20 weight percent of the low density polyethylene, to enhance processability. Also, because these prior art blends exhibit high viscosities at the high shear rates associated with extrusion coating, they tend to generate excessive melt temperatures in the feed sections of extruder screws. These high melt temperatures in the feed section cause extruder output variations, or surging, along with melt fracture and gel formation, all of which introduce quality defects. The prior art blends also exhibit high neck-in of the molten polymer web with its associated edge instability. The edge instability of the molten web requires that the edge be trimmed, which results in costly polymer waste. These facts are discussed in a technical article published in *Converting Magazine*, March 1997, entitled "Benefits, Processing Ease, Keep LDPE in the Mix".

The above technical article also reports that "performance capabilities of LDPE (low density polyethylene) are broadened by the addition of comonomers. Vinyl acetate and methyl acrylate are two primary examples." Ethylene vinyl acetate (EVA) copolymers permit lower heat seal initiation temperatures in those heat sealing operations requiring such low sealing temperatures. Ethylene methyl acrylate (EMA) copolymers display strong heat-seal characteristics for both film and extrusion coating applications."

Copolymers of ethylene and methyl acrylate, containing about 2 weight percent to about 5 weight percent methyl acrylate, are thermally stable. However, the prior art blends containing linear low density copolymers of ethylene and octene (or any other α-olefin), and the low density copolymers of ethylene and vinyl acetate, containing about 2 weight percent to about 18 weight percent vinyl acetate, are thermally unstable. Either copolymer will degrade if it remains for too long in a heated extruder barrel, such as during a temporary operational shutdown. Such degradation, or molecular breakdown, generates massive defects in subsequent extrusion coatings. In most cases, the extrusion operator must clean his equipment before he can continue with production. Because of the copolymers' being prone to thermal degradation, these copolymers must be purged from the extruder before extruder screw rotation is stopped. The purge material is usually an inert polymer such as a low density polyethylene homopolymer. Such an inert polyethylene homopolymer can remain in an extruder until that extruder's next operational startup, and it can remain in an extruder through the heat-up cycle necessary to reach the extruder temperatures required to extrusion coat a copolymer. This need for purging the thermally unstable copolymers from extruders is materially costly, with the purge material having to be purchased and inventoried at the site of the extrusion coating operation.

Considering the problems associated with extrusion coating the above two copolymers, there is need for a more ideal homopolymer based on ethylene. Such a polymer would be an inert homopolymer of ethylene, extrusion coatings of which would be capable of equaling or exceeding the heat seal strengths of linear low density copolymers of ethylene and octene (or any other α-olefin), or the low density copolymer of ethylene and vinyl acetate. Such an ideal homopolymer would exhibit none of those problems of a linear low density polyethylene blend; that is, the ideal homopolymer would not require high extruder drive amps. Nor would it exhibit high viscosities due to high shear rates, which, in turn, generate excessive melt temperatures, melt fracture, and gels. Nor would such an ideal homopolymer generate high web neck-in, such high neck-in manifesting itself in unstable web edges, which must be trimmed away with loss of material. Finally, such an ideal homopolymer would not require purging each time an extrusion operation is interrupted, and it could remain in the extruder indefinitely between production start-ups.

SUMMARY OF THE INVENTION

The present inventors have unexpectedly discovered an improved extrusion coating ethylene homopolymer composition of matter comprising a two-component blend of polyethylene homopolymers. The first component is a low melt index medium density polyethylene to provide strong heat seals. The second component is a high melt index low density polyethylene to provide a good wetting of substrates, such good wetting being essential to good coating-to-substrate adhesion, with a good adhesion being essential to strong heat seals.

The present invention unexpectedly permits heat seal strengths exceeding those of linear low density polyethylene compositions. In addition, the present invention presents none of the aforementioned extrusion coating problems, such as thermal instability, associated with linear low density copolymers of ethylene and octene (or any other α-olefin) or low density copolymers of ethylene and vinyl acetate.

DESCRIPTION OF THE PREFERRED EMBODIMENTS

U.S. Pat. No. 5,268,230 and 5,350,476, copending application Ser. No. 09/023,900, filed Feb. 13, 1998 (based on Provisional Application Ser. No. 60/036,297, filed Feb. 19, 1997; Eastman Chemical Company Docket No. 70537), and copending application Ser. No. 09/037,558, filed Mar. 9, 1998 (bassed on Provisional Application Ser. No. 60/043, 222, filed Apr. 9,1997; Eastman Chemical Company Docket No. 70632) describe processes to produce high gloss extrusion coatings and smooth paper laminates. Similarly, copending application Ser. No. 09/048,455, filed Mar. 26, 1998 (based on Provisional Application Ser. No. 60/043,935, filed Apr. 21, 1997; Eastman Chemical Company Docket No. 70638; and on Provisional Application Ser. No. 601055, 768, filed Aug. 14, 1997; Eastman Chemical Company Docket No. 70732) discloses improved 3-component blends of a linear low density polyethylene and two polyethylene homopolymers. Each of these patents and applications are hereby incorporated by reference. One polyethylene involved in each of the above five documents is a medium density polyethylene of narrow molecular weight distribution having a melt index of 0.5-dg/min to 4-dg/min at 190° C., a swell ratio of 1.2 to 1.35, an annealed density of about 0.926-g/cc, and a polydispersity index at or below 9. This same medium density polyethylene is the first component of the two component polyethylene blend according to the present invention.

The blend according to the present invention also contains a second component, a low density polyethylene of broad molecular weight distribution having a melt index range of 18-dg/min to 22-dg/min, measured at 190° C., a swell ratio greater than 1.60, an annealed density of about 0.91-g/cc to about 0.92-g/cc, and a polydispersity above 9.

The blends are prepared by mixing at least the above two components by methods known in the art. Additional polyethylene components may also be added, as well as other known additives such as fillers, pigments, etc. It is preferred that the first component above be present in a major amount, i.e., greater than 50 weight percent. An even more preferred blend is one wherein the first component above is present in the amount of about 80 weight percent and the second component above is present in the amount of about 20 weight percent.

Various extrusion coating methods are known in the art, such as extruding against glossy chill rolls or matte chill rolls. The composition according to the present invention can be used in any known extrusion process.

EXPERIMENTAL

In the forthcoming examples, the properties are determined as follows:

Melt index was determined in accordance with ASTM D1238-62T at 374° F. (190° C.). Swell ratio is defined as the ratio of the diameter of the extrudate over that of the orifice diameter of the extrusion plastometer in ASTM D1238-62T. The diameter of the specimen is measured in the area between 0.159-cm and 0.952-cm of the initial portion of the specimen as it emerges from the extrusion plastometer. Measurements were made by standard methods according to ASTM D374.

Annealed density was determined in accordance with ASTM D1505.

Polydispersity index is the ratio of the weight-average molecular weight, $M_w$, to number-average molecular weight, $M_n$. $M_w$ and $M_n$ were obtained by size-exclusion chromatography on a Waters 150C gel permeation chromatograph equipped with the standard refractometer detector and a Viscotek 150R differential viscometer system. The 3-column set consisted of Waters' $10^3$, $10^4$, and linear-mixed bed ($10^3$, $10^4$, and $10^5$) Micro-Styragel HT columns. The samples were run as 0.125% (weight/volume) solutions in ortho-dichlorobenzene at 140° C. The data were interpreted using Viscotek Unical software (V4.02), by universal calibration using NBS 1475 (linear polyethylene) and NBS 1476 (branched polyethylene) for any polyethylene sample.

Heat seal strength is determined by thermally welding opposing polymer coating specimens, each 1.00-inch (2.54-cm) wide, using a Sentinel Bar Sealer, Model 12AF. The top sealing bar only is heated to 400° F. (205° C.), with the non-heated bottom sealing bar protected with a teflon tape. The opposing coatings are clamped between the sealing bars at a force of 40-psi (2.82-Kg/cm$^2$) for 2.0-seconds. Sealed specimens are then tested for seal strength in a Thwing-Albert Tensile Tester, Model 1450-24-8, equipped with a 9.8-lb (4.4-Kg) load cell, pulled at a separation rate of 5.0-in/min (12.6-cm/min). Seal strength, in grams, is noted.

EXAMPLES

EXAMPLE 1

A 2-component polymeric blend according to the present invention was made by blending the following components as previously described in the Description of the Preferred Embodiments, above:

1) 20 weight percent of a 18–22-dg/min melt index, broad molecular weight polyethylene homopolymer.

2) 80 weight percent of a 0.5–4.0-dg/min melt index, narrow molecular weight polyethylene homopolymer.

The resultant melt index of this blend was 2.8-dg/min.

This formulation was extrusion coated to a foil/polyethylene/paperboard paperboard structure having aluminum foil as an outer surface; namely, 0.000285-inch (0.00725-mm) foil/Low Density Polyethylene/Bleached Machine-Glazed paper. The foil surface had first been primed with MICA Corporation's MICA A-291-C, a water based polymeric chromium complex compound, designed for aluminum foil. The polymer was applied to the primed foil at a melt temperature of 580° F. (305° C.) at a sufficient extrusion rate to achieve a coating thickness of 0.002-inch (0.0508-mm) at 132-fpm (14-m/min).

During extrusion, the extruder feed zones, Zones 1, 2, and 3, equilibrated to 290° F. (143° C.), 250° F. (121° C.), and 548° F. (287° C.), respectively.

Heat seal strength was 9.0-lb/inch (1.65 kg/cm).

EXAMPLE 2

Comparative

Dow Chemical Company's linear low density polyethylene formula 3010 is a blend of about 20% by weight of a low density homopolymer polyethylene and about 80% by weight of a copolymer of ethylene and octene, containing about 7% to 10% by weight of octene. This formulation was extrusion coated to a foil/polyethylene/ paperboard structure having aluminum foil as an outer surface; namely, 0.000285 foil/Low Density Polyethylene/Bleached Machine-Glazed paper. The foil surface had first been primed with MICA Corporation's MICA A-291-C, a water based polymeric chromium complex compound, designed for aluminum foil. The polymer was applied to the primed foil at a melt temperature of 597° F. (314° C.) at a sufficient extrusion rate to achieve a coating thickness of 0.002-inch (0.0508-mm) at 132-fpm (14-m/min).

During extrusion, the extruder feed zones, Zones 1, 2, and 3, equilibrated to 397° F. (202° C.), 497° F. (258° C.), and 568° F. (298° C.), respectively.

Heat seal strength was 6.6-lb/inch (1.84 kg/cm).

EXAMPLE 3

Comparative

DSM's linear low density polyethylene formula STAMYLEX 1066F is a blend of about 20% by weight of a low density homopolymer polyethylene and about 80% by weight of a copolymer of ethylene and octene, containing about 7% to 10% by weight of octene. This formulation was extrusion coated to a foil/polyethylene/ paperboard structure having aluminum foil as an outer surface; namely, 0.000285 foil/Low Density Polyethylene/Bleached Machine-Glazed paper. The foil surface had first been primed with MICA Corporation's MICA A-291-C, a water based polymeric chromium complex compound, designed for aluminum foil. The polymer was applied to the primed foil at a melt temperature of 600° F. (316° C.) at a sufficient extrusion rate to achieve a coating thickness of 0.002-inch (0.0508-mm) at 132-fpm (14-m/min).

During extrusion, the extruder feed zones, Zones 1, 2, and 3, equilibrated to 398° F. (204° C.), 498° F. (258° C.), and 571° F. (300° C.), respectively.

Heat seal strength was 5.9-lb/inch (1.06 kg/cm).

EXAMPLE 4

Comparative

Rexene's linear low density polyethylene formula 2503-10 is a blend of about 20% by weight of a low density homopolymer polyethylene and about 80% by weight of a copolymer of ethylene and octene, containing about 7% to 10% by weight of octene. This formulation was extrusion coated to a foil/polyethylene/ paperboard structure having aluminum foil as an outer surface; namely, 0.000285 foil/ Low Density Polyethylene/Bleached Machine-Glazed paper. The foil surface had first been primed with MICA Corporation's MICA A-291-C, a water based polymeric chromium complex compound, designed for aluminum foil. The polymer was applied to the primed foil at a melt temperature of 597° F. (314° C.) at a sufficient extrusion rate to achieve a coating thickness of 0.002-inch (0.0508-mm) at 132-fpm (14-m/min).

During extrusion, the extruder feed zones, Zones 1, 2, and 3, equilibrated to 399° F. (204° C.), 498° F. (258° C.), and 569° F. (298° C.), respectively.

Heat seal strength was 7.0-lb/inch (1.34 kg/cm).

EXAMPLE 5

Comparative

Millennium's formula GA615050 is a an octene-ethylene copolymer containing 7 weight percent to 10 weight percent octene. Rexene's low density polyethylene formula 5050 is a polyethylene homopolymer. The two polymers were tumble blended at a ratio of 80 weight percent of the Millennium GA615050 copolymer to 20 weight percent of the Rexene low density formula 5050. Such dilution of the Millennium copolymer was necessary to permit its being extrusion coatable. This tumbled blend was extrusion coated to a foil/polyethylene/ paperboard structure having aluminum foil as an outer surface; namely, 0.000285 foil/Low Density Polyethylene/Bleached Machine-Glazed paper. The foil surface had first been primed with MICA Corporation's MICA A-291-C, a water based polymeric chromium complex compound, designed for aluminum foil. The polymer was applied to the primed foil at a melt temperature of 601° F. (316° C.) at a sufficient extrusion rate to achieve a coating thickness of 0.002-inch (0.0508-mm) at 132-fpm (14-m lmin).

During extrusion, the extruder feed zones, Zones 1, 2, and 3, equilibrated to 401° F. (205° C.), 498° F. (258° C.), and 563° F. (295° C.), respectively.

Heat seal strength was 5.1-lb/inch (0.90 kg/cm).

The above examples show unexpectedly that the present invention (Example 1) provides stronger heat seals than the linear low density polyethylene formulations (Examples 2 through 5), even as a pure homopolymer of ethylene, without the presence of an α-olefin-ethylene copolymer. The absence of a copolymer in the present invention means that it is thermally stable, unlike those examples containing copolymers, and requires no purging of an extruder following an operational shutdown. These examples further show that the present invention, unlike the linear low density polyethylenes, does not build up excessive heat in the feed sections of the extruder. Thus, the present invention solves the problems of surging, melt fracture, and gel formation.

Numerous modifications and variations are possible, and it is to be understood that within the scope of the appended claims, the invention may be practiced otherwise than as specifically described herein within the spirit and scope of the invention. Moreover, all patents, patent applications, provisional patent applications, and literature references cited above are incorporated herein by reference for any disclosure pertinent to the practice of this invention.

What is claimed is:

1. A composition including two polyethylene homopolymers, said composition comprising:

a first component comprising a medium density polyethylene of narrow molecular weight distribution having a melt index of 0.5-dg/min to 4 dg/min at 190° C., a swell ratio of 1.2 to 1.35, an annealed density of about 0.926-g/cc, and a polydispersity index at or below 9; and a second component comprising a low density polyethylene of broad molecular weight distribution having a melt index range of 18-dg/min to 22 dg/min, measured at 190° C., a swell ratio greater than 1.60, an annealed density of about 0.91-g/cc to about 0.92-g/cc, and a polydispersity above 9.

2. A composition according to claim 1, wherein said first component is present in the amount of greater than 50 weight percent, based on the weight of the composition.

3. A composition according to claim 1, wherein said first component is present in the amount of about 80 weight percent and said second component is present in the amount of about 20 weight percent.

4. An article comprising a substrate and an extrusion coating, wherein said extrusion coating is a composition according to any of claims 1, 2, or 3.

5. An article according to claim 4, including at least one layer between said substrate and said extrusion coating.

6. An article according to claim 4, including a primer layer between said substrate and said extrusion coating.

* * * * *